April 26, 1949. J. C. STEVENS 2,468,692
MEASURING DEVICE
Filed March 21, 1947 3 Sheets-Sheet 1

Inventor
John C. Stevens
By Stevens, Davis and Miller
Attorneys

April 26, 1949. J. C. STEVENS 2,468,692
MEASURING DEVICE
Filed March 21, 1947 3 Sheets-Sheet 3

Inventor
John C. Stevens
By Stevens, Davis and Miller
Attorneys

Patented Apr. 26, 1949

2,468,692

UNITED STATES PATENT OFFICE 2,468,692

MEASURING DEVICE

John C. Stevens, Portland, Oreg., assignor to Leupold & Stevens Instruments, Portland, Oreg., a partnership composed of Marcus Leupold, John C. Stevens, Norbert Leupold, and R. J. Stevens Application March 21, 1947, Serial No. 736,283

2 Claims. (Cl. 137—106)

1

This invention relates to automatic siphons and more particularly to a self-draining measuring device which may be used to advantage with a recording rain gauge to increase the length of time of unattended operation thereof.

In rain gauges of the type heretofore known it is common to provide a rain-receiving receptacle and a timing device associated therewith to record continuously the amount of water received by the receptacle. Gauges of this sort are perfectly satisfactory until the receiving receptacle is filled. After that, however, unless the receptacle is emptied by servicing personnel, it is apparent that further precipitation will cause overflow of the container and will not influence the recording device. Efforts to solve this problem and to produce a recording rain gauge suitable for unattended use over long periods of time have not met with success. The use of large rain-receiving receptacles has not afforded a solution to the problem due to the fact that they introduce factors deleteriously affecting the accuracy of the instrument and increasing its cost.

It is therefore an object of this invention to provide a recording-type rain gauge which is susceptible of unattended operation over long periods of time and which is characterized by a rain-receiving receptacle of normal size and a production cost which permits of price competition with gauges of a type requiring the frequent attention of servicing personnel.

It is proposed in accordance with the present invention to provide a receptacle which will automatically drain itself in a quick and efficient manner upon the attainment therein of a predetermined liquid level.

It is therefore a further object of this invention to provide a self-draining measuring receptacle which is of wide general utility and of specific utility in connection with a recording-type rain gauge.

Other objects and advantages of the invention will be apparent upon reference to the following detailed description of a preferred embodiment thereof in conjunction with the annexed drawings wherein:

Figure 2 is a view partially in vertical section and partially in elevation of the apparatus of

2

Figure 1:
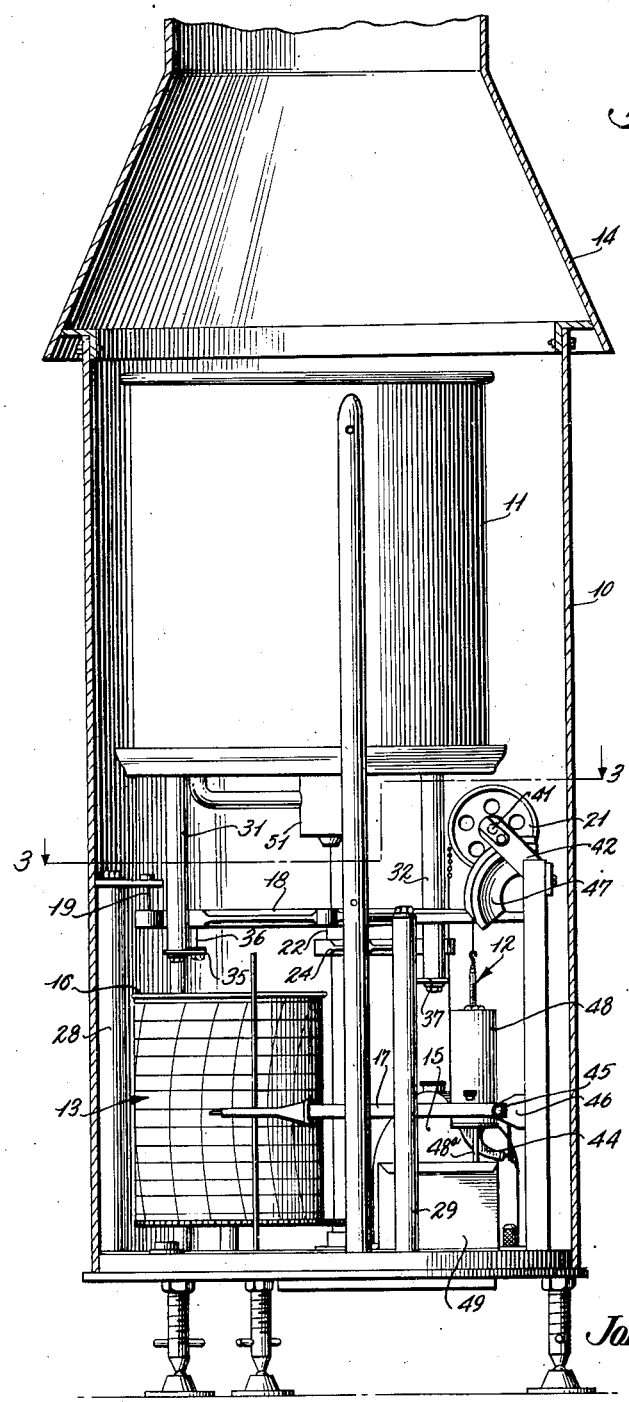
Figure 1 is a view partially in vertical section and partially in elevation of a self-draining measuring receptacle constructed in accordance with the teachings of the present invention, the receptacle being shown in combination with a weighing-type recording rain gauge of conventional design.
Figure 2:
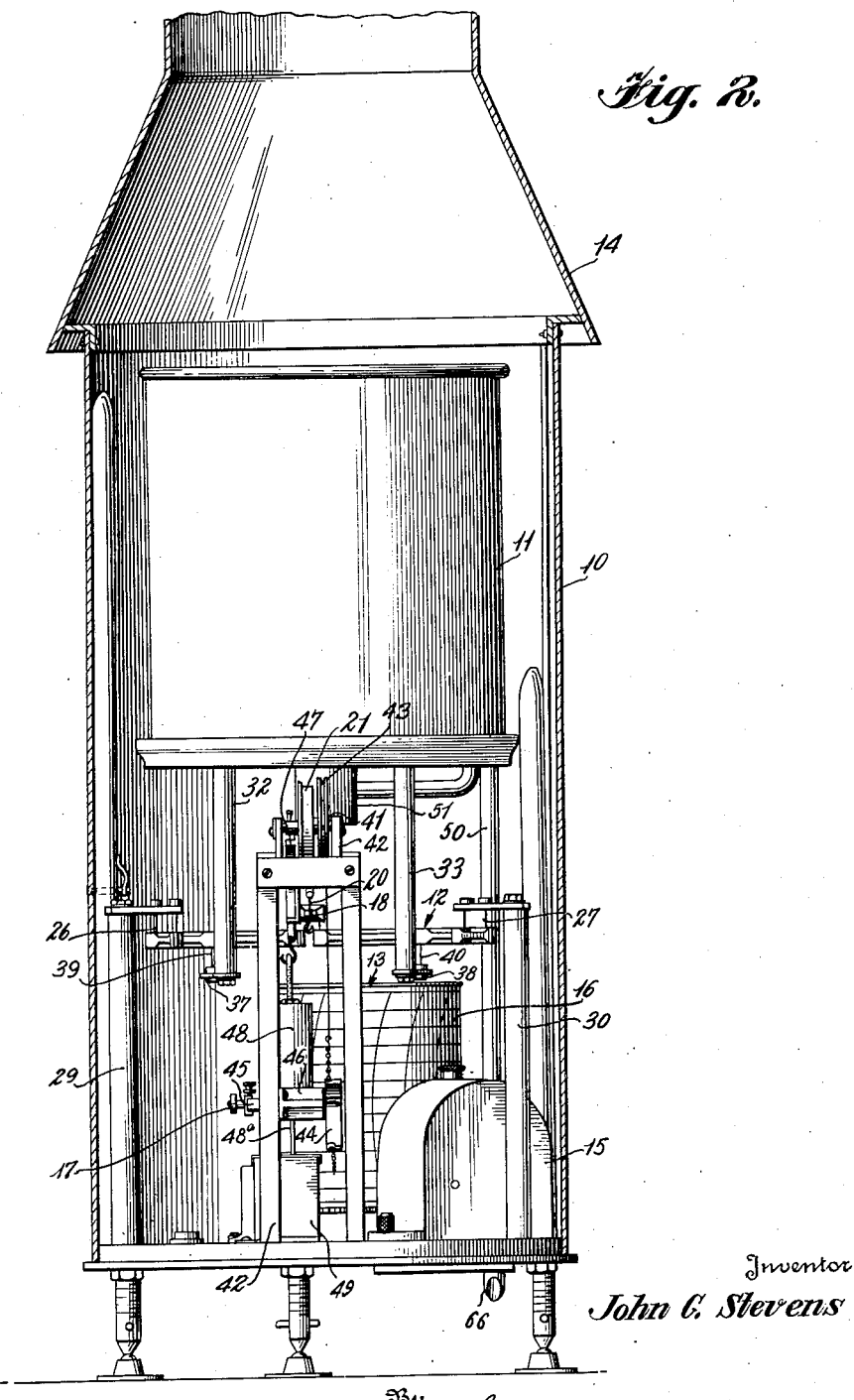
Figure 3:
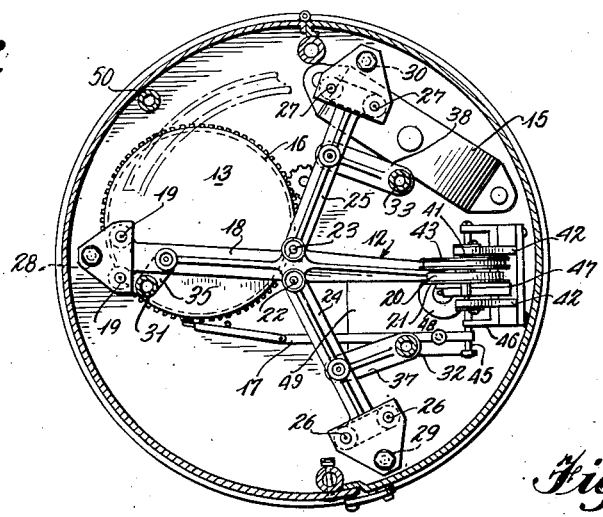

Figure 1, the Figure 2 view being taken about 90° away from the view constituting Figure 1;

Figure 3 is a view in section taken along the line 3—3 of Figure 1; and

Figure 4:
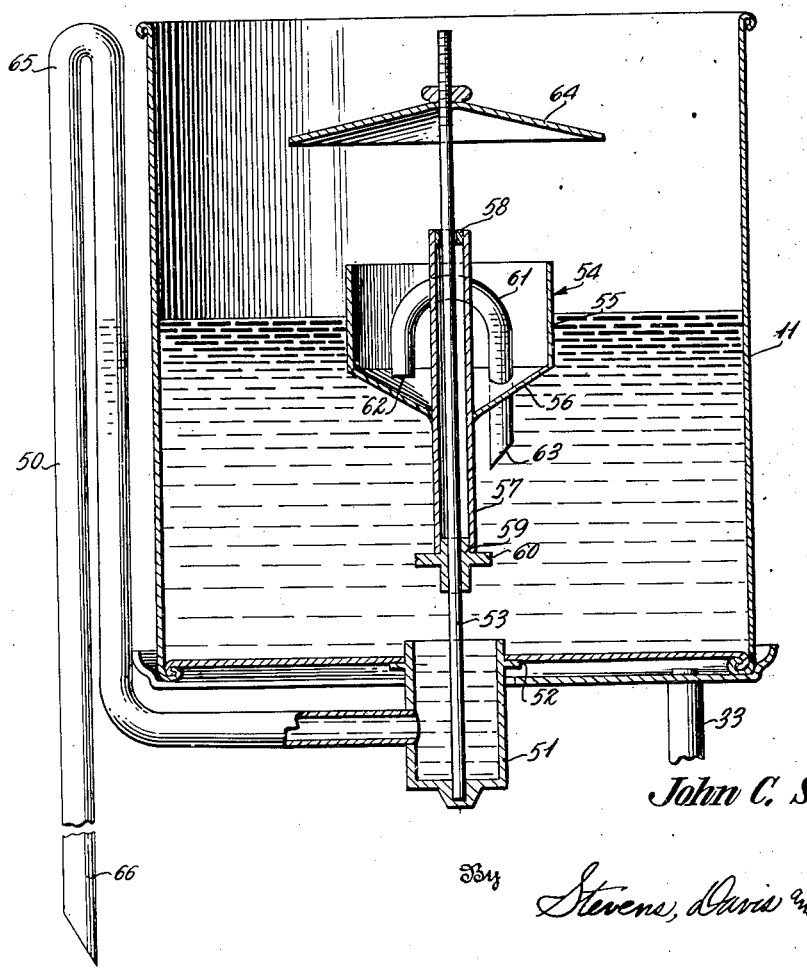

Figure 4 is a detailed view in vertical section of the receptacle of the present invention showing the internal construction thereof.

Now referring to Figures 1, 2 and 3 of the drawings, the gauge there shown is comprised of a housing 10, a rain-receiving receptacle 11, a weighing device 12 and a recording device 13. A hood 14 supporting a standard Weather Bureau collector ring is disposed above the housing 10 and is supported thereby in such position that the rain falls through the collector and into the open top of the collection receptacle 11. As the liquid level in this receptacle rises, the over-all weight of the receptacle and contained water increases and this weight increase is proportional to the volume of liquid received in the receptacle 11.

In order that a record may be made of precipitation during a predetermined period of time, a clock mechanism 15 is connected to rotate the drum 16 of the recorder 13 and a pen 17 operated by the weighing mechanism 12 bears against a record paper attached to the drum 16 and records thereon a line corresponding to inches of equivalent liquid precipitation caught within the container 11. Thus, the abscissa values of the resulting graph are time controlled and the ordinate values are inches of precipitation controlled by the weighing mechanism in response to the fluctuations of liquid volume in tank 11.

The weighing mechanism comprises a central beam 18 suspended at one end on cable hangers 19 and at the other end supported by a thin metal ribbon 20 attached to a pulley 21. Suspended from beam 18 on cable hangers 22 and 23 are auxiliary beams 24 and 25 which are suspended at their ends remote from the beam 18 by cable hangers 26 and 27. The cable hangers 19, 26 and 27 are attached to brackets which are supported from standards 28, 29 and 30 respectively extending upwardly from the base of the housing. The receptacle 11 is held in a platform which has dependent therefrom three supporting rods 31, 32 and 33. Rod 31 transfers ⅓ of the weight to the beam by means of a bracket 35 and a cable hanger 36; similarly rods 32 and 33 each transfer ⅓ of the weight to beams 24 and 25 respectively through brackets 37 and 38 and cable hangers 39 and 40.

It can now be seen that the entire receptacle assembly including tank 11, its platform, the rods 31, 32 and 33, as well as their respective brackets, are hung from the beams 18, 24 and 25. It is also apparent that variations in the weight of this assembly, caused by fluctuations in the volume of water within the receptacle 11, will cause rotation of the pulley 21 through the ribbon 20. Pulley 21 is keyed to a shaft 41 mounted for rotation in bearings supported from standards 42 and another pulley 43 is also keyed to that shaft for rotation therewith. The pulley 43, through a chain, is connected to a sector 44 keyed to a shaft 45 journaled in a bracket 46. The pen 17 also is attached to the shaft 45 and it can now be seen that the movement of the beams will cause movement of the pen about the axis of the shaft 45.

The entire weight of tank 11 and contents, its platform and supporting rods and brackets as well as a portion of beams 18, 24 and 25 is balanced by a counterweight 48 suspended from the sector 47 which is attached eccentrically to the pulley 21 in such a manner that, as the weight in tank 11 increases, the weight 48 is moved farther away from the axis of rotation which is shaft 41. Upon reduction in the contents of tank 11 the weight 48 is moved toward the axis of rotation.

The pen 17 is articulated in the conventional manner and pen release mechanism is provided for moving the pen 17 away from the drum. A damping mechanism comprised of a thin metal disk attached to the counterweight 48 by a rod 48a operating in an oil chamber 49, is also provided.

Referring now in particular to Figure 4 of the drawings, the tank 11, which is employed for collecting the rainfall through its open top is drained, according to the present invention, by a siphon tube 50 which is connected to a side wall of a small chamber 51 which is closed at its bottom and at its top opens into the bottom of the tank 11. Chamber 51 is provided with an annular flange 52 and is fastened in any suitable way to the bottom of the tank 11 to provide a leak-proof connection. The rim of chamber 51 extends above the bottom of tank 11. Mounted in the bottom of chamber 51 and extending vertically through that chamber and the tank 11 is a standard 53 which is externally threaded at its upper end. Mounted for movement on the standard 53 is a float assembly 54 consisting of an open float tank 55 of cylindrical cross section having a frusto conical bottom portion 56 fastened to, and supporting, a hollow sleeve 57 which extends vertically through the float tank 55 and vertically therebelow. At the top of the sleeve 57 there is provided a bearing 58 and at the bottom thereof there is provided a bearing 59. The bearings 58 and 59 freely engage the standard 53 so that the float assembly 54 is guided but is free to move up and down the standard 53 as may be required. The bearing 59 is provided with an annular flange 60 which is of a cross section to form a close clearance fit within the interior of cylindrical chamber 51.

Within the float tank 55 there is disposed a siphon tube 61, one end 62 of which lies within the float tank, and the other end 63 of which lies outside of the float tank but within the tank 11. The portion of the siphon tube 61 which passes through the conical wall 56 of the float tank is attached thereto in any suitable liquid-proof manner.

Threaded to the upper end of the standard 53 there is disposed a rain shield or cover 64, the purpose of which is to prevent liquid entering the top of the tank 11 from falling into the float tank 55. Furthermore, since the standard 53 is stationary and the cover 64 is fixed thereto, the center of the cover functions as a stop to limit the upward movement of the sleeve 57. The downward movement of the sleeve is limited by the lower edge of the bearing 59, which, in the extreme lowered position of the sleeve, rests against the bottom of the cylindrical chamber 51.

The operation of the device will be described both with reference to its use as a self-starting siphon and with reference to its use with a rain recorder of the type hereinbefore described. Assuming that the tank 11 is disposed as shown, with its open top in rain-receiving position and that it is positioned with a gauge as indicated in Fig. 1, the starting position of the float tank 55 will be in its lowermost position, i. e.: with the bottom of the bearing 59 of the sleeve 57 resting on the bottom of the chamber 51. An initial charge of water is poured into tank 11 enough to fill the chamber 51 to its connection with the siphon tube 50. At this position the pen is set as zero on the chart. As more liquid falls into tank 11 the remainder of chamber 51 and the tube 50 begin to fill, and as more liquid enters the tank 11 the liquid level gradually rises therein and in tube 50 until there is sufficient water in the tank 11 to float the float assembly 54. At that time the sleeve 57 begins to move upwardly under the buoyant influence of the float tank. This upward movement continues until the liquid level rises to such a point that the bearing 58 is in engagement with the underside of the cover 64. At this point no further upward movement of the sleeve 57 can take place and further liquid falling into the tank 11 eventually raises the liquid level to a point where the water spills over the edge of the float tank 55 and causes the float assembly to sink. When this occurs, the float assembly 54 falls through the liquid in tank 11 from its extreme upper position to its extreme lower position and the flange 60 functions in the chamber 51 as a piston, displacing liquid through tube 50 and over the highest point 65 of that tube. This causes the tube 50 to function as a siphon to drain the tank 11, the liquid from the tank 11 flowing around the sleeve 57 and between that sleeve and the inner walls of the chamber 51. During the fall of the float assembly 54 through the liquid of tank 11, siphon tube 61 has been filled with liquid by the impact of its end 63 with the liquid of tank 11 due to its velocity of descent. Tube 61 is therefore ready to function as a siphon whenever the liquid level in tank 11 falls below that in float 55. As the liquid level in tank 11 falls below the now stationary rim of float 55, the liquid in float 55 is drained into tank 11 and thence out through siphon 50. When the liquid in chamber 51 falls to the connection with tube 50, air is admitted to tube 50 and the siphonic action is broken. During this process, which occupies only a fraction of a minute, the pen drops to the zero line of the chart and the entire mechanism is then in readiness to repeat the cycle as more liquid is caught in tank 11. The total precipitation is easily determined from the chart by noting the difference between the initial and final settings of the pen and the number of emptyings recorded.

In order to avoid loss by evaporation a few ounces of oil may be put into tank 11 and since the rim of chamber 51 is above the bottom of tank 11 only a small portion of this oil can be carried out at each emptying.

It is to be noted that the end 63 of the tube 61 and the end 66 of the tube 50 are beveled.

This is to prevent a liquid lock in the downstream leg due to the surface tension of the liquid. Since the effect of the surface tension varies with the interior cross section of the tube, and since the interior cross section is effectively enlarged by a bevel cut, the use of bevels at the downstream ends of the tubes 63 and 50 is of advantage in permitting the use of smaller, less cumbersome equipment.

It will be understood that as the liquid rises within float tank 55 it will rise within the tube 61 from both ends and that there will be an air bubble at the top of the siphon 61. When the float falls to its lowermost position this bubble is expelled by the current of liquid entering the end 63 of the siphon 61 and the siphon is conditioned to drain the float. Similarly the gas in the downstream leg of the siphon 50 is expelled by the action of the piston 60 passing through the cylinder chamber 51 forcing a "slug" of liquid over the bend 65.

As the device of the present invention is used with a liquid level recorder, it is possible to record rainfall at a 1:1 ratio over very long periods of time without the attention of an operator. The recorder will, of course, indicate a vertical line at the time the tank is discharging.

While the present invention finds important utility in the rain recording art, it is to be understood that the self-starting siphon arrangement of the present invention is susceptible of widespread application in various industrial arts to effect measurements in any instance where cyclic discharge of a predetermined liquid volume is desired.

What is claimed is:

1. A measuring device comprising a tank, a piston chamber opening into the bottom of said tank, a primary siphon tube for draining said tank, one end of said tube connecting into said chamber and the other end lying below the point of connection with said chamber, said siphon intermediate its ends extending to a predetermined point above the bottom of said tank, a buoyant float having an open top, a piston carried by said float, a vertical rod extending upwardly from the bottom of said chamber for guiding said float and piston for vertical movement, means attached to the upper end of said rod for limiting the upward movement of the float, said piston in its lowermost position lying within said chamber, and a secondary siphon for draining said float.

2. A measuring device as claimed in claim 1 wherein the tank is open at its top and the means attached to the upper end of said rod for limiting the upward movement of the float is a shield preventing liquid flowing into the top of the tank from falling into the float.

JOHN C. STEVENS.

REFERENCES CITED

The following references are of record in the file of this patent:

UNITED STATES PATENTS

| Number | Name | Date |
|---|---|---|
| 336,072 | Shaffer | Feb. 9, 1886 |
| 679,388 | Meyer | July 30, 1901 |
| 776,014 | Douglas | Nov. 29, 1904 |
| 922,698 | Harrison | May 25, 1909 |
| 1,355,988 | McNeil | Oct. 19, 1920 |
| 1,949,387 | Hardcastle | Feb. 27, 1934 |

FOREIGN PATENTS

| Number | Country | Date |
|---|---|---|
| 8,214 | Great Britain | 1901 |
| 8,809 | Great Britain | 1900 |
| 290,284 | Italy | Nov. 14, 1931 |